June 19, 1934.  J. S. MORGAN, JR., ET AL  1,963,332
TWO SPEED ROTARY MACHINE
Filed April 17, 1931  3 Sheets-Sheet 3
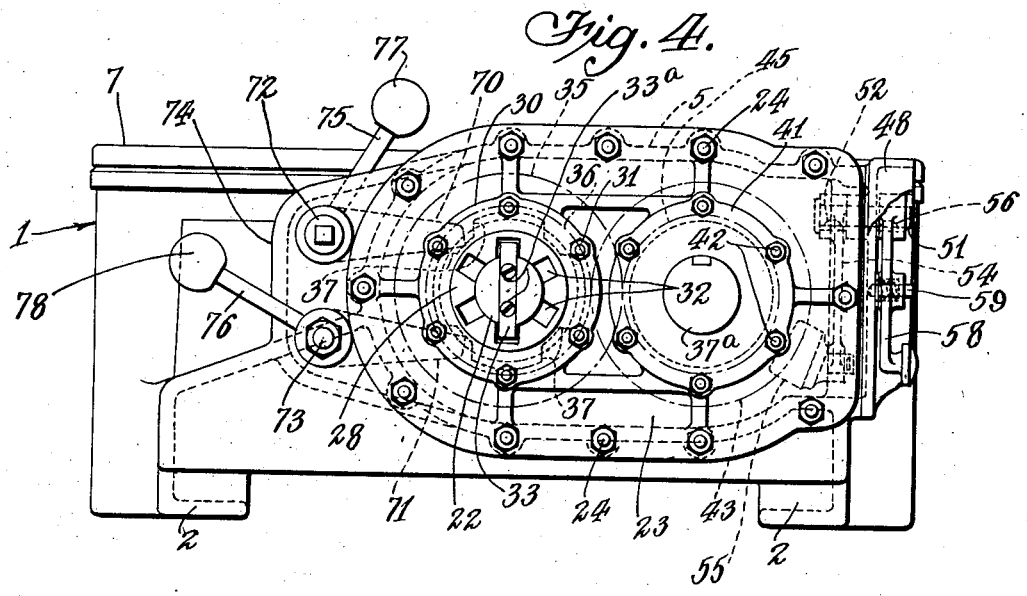
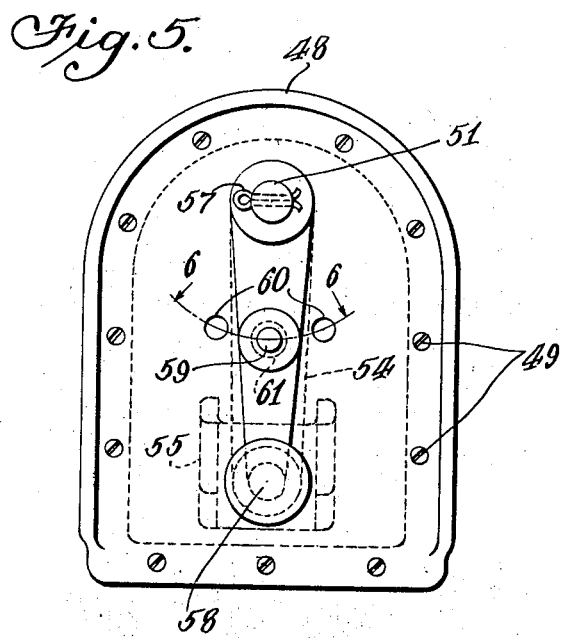
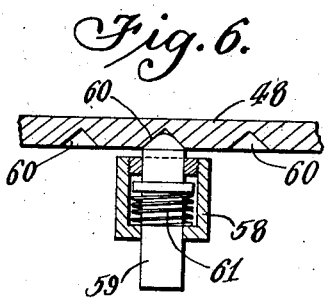
Inventors
John Shelby Morgan Jr.
Allen Erwin Rice
By Lyon & Lyon
Attorneys Patented June 19, 1934

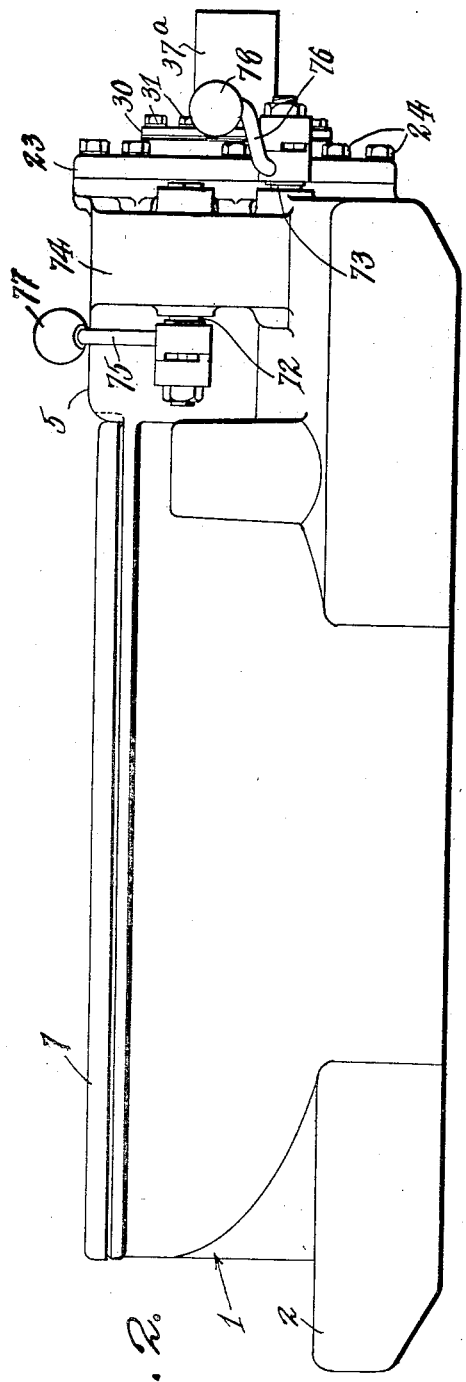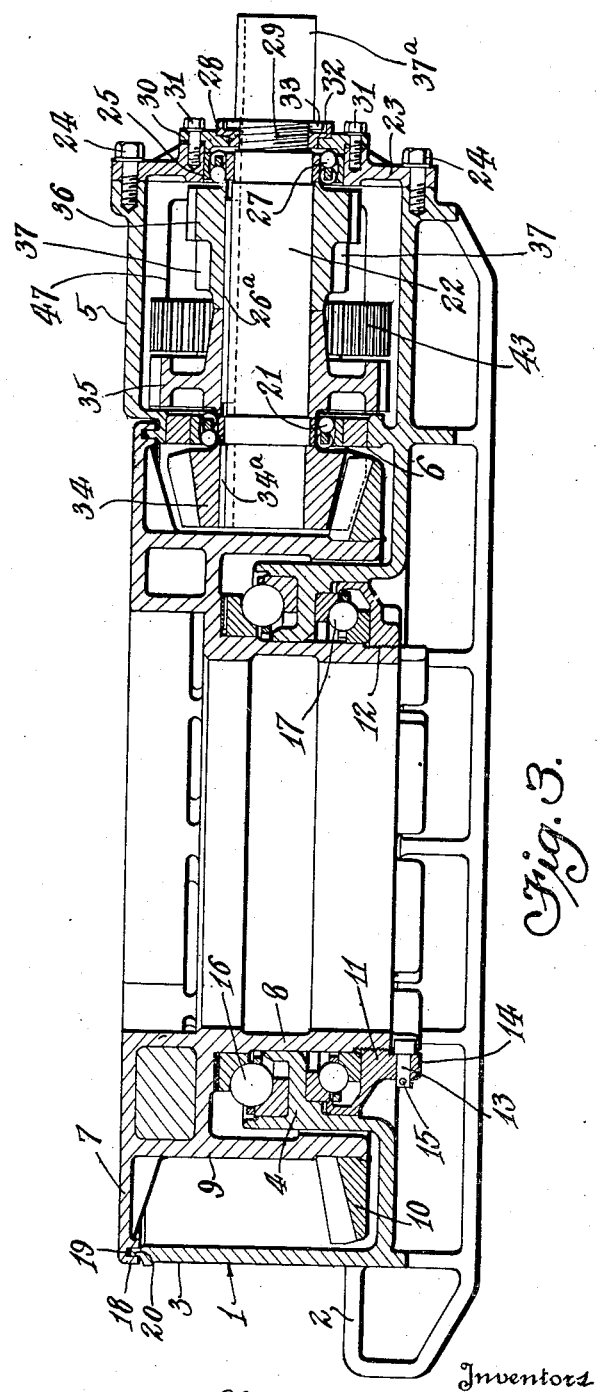

1,963,332

UNITED STATES PATENT OFFICE 1,963,332

TWO SPEED ROTARY MACHINE

John Shelby Morgan, Jr., Inglewood, and Allen Erwin Rice, Hermosa Beach, Calif., assignors, by mesne assignments, to The National Superior Company, Toledo, Ohio, a corporation of Delaware Application April 17, 1931, Serial No. 530,842

17 Claims. (Cl. 255—23)

This invention relates to a two speed rotary machine for use in deep well drilling.

One of the long felt needs in the art of deep well drilling is the need for a high and low speed rotary machine where the low speed is normally one-half of the normal operating speed which is desirable when using rock bits, taking cores, rotating out of hole, changing line and for many other deep well drilling problems. An object of this invention is to meet this long felt need for a two speed rotary machine.

Another object of this invention is to provide a locking means whereby the driving means may be locked against rotation in either clockwise or counter-clockwise direction or against rotation in both directions.

Another object of this invention is to provide a driving mechanism having a normal operating speed and a low speed and also having a neutral position at which the driving mechanism is totally disconnected from driving engagement with the table of a rotary machine.

Another object of this invention is to provide a gear shifting apparatus to shift the sliding gears to the desired speed or neutral position.

Another object of this invention is to provide yieldable locking means for retaining the gear shifting mechanism in the desired setting.

A further object of this invention is to provide a rotary machine in which the working parts are completely enclosed to avoid the introduction of mud, grit or other foreign matter into the bearings and driving gears of the machine.

Another object of this invention is to provide a unitary base casting for supporting and enclosing the working parts of the rotary machine.

Other objects and advantages of this invention will be apparent from the following detailed descripiton of a preferred embodiment thereof as illustrated in the accompanying drawings.

In the drawings—

Figure 2 is a side elevation thereof.

Figure 3 is a sectional elevation taken substantially on the line 3—3 of Figure 1.

Figure 4 is an end elevation.

Figure 5 is a plan view of the gear shifting lever and shifter plate.

Figure 6 is an enlarged fragmental view taken substantially on the line 6—6 of Figure 5.

Figure 1:
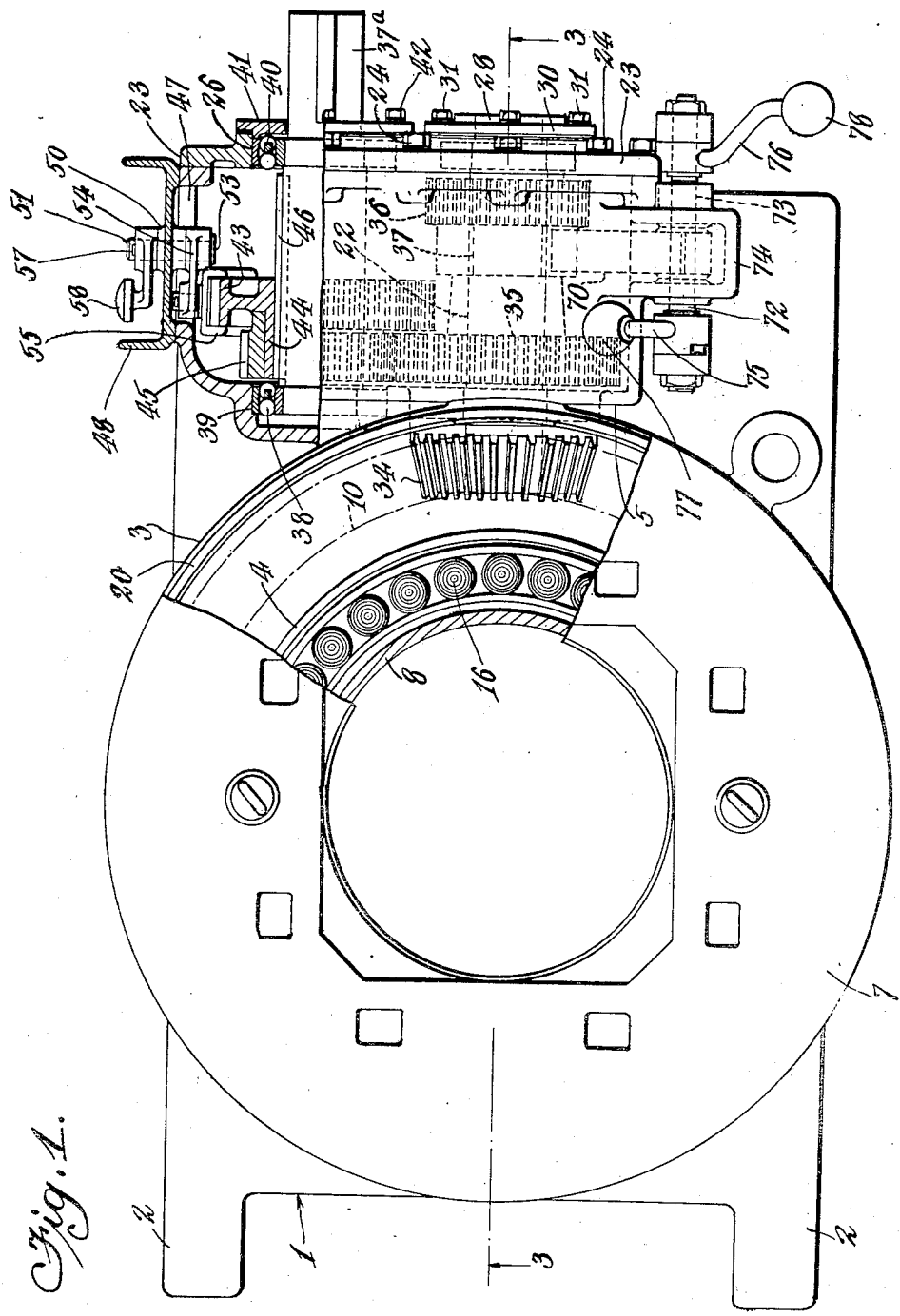
Figure 1 is a top plan view partly in section of a two speed rotary machine embodying the invention.

In the preferred embodiment of the invention as illustrated in the drawings, there is provided a unitary base structure 1 comprising skids 2, an annular flange 3, a flanged bearing supporting ring 4 positioned centrally within the annular flange 3, and an open ended gear housing 5 adjacent the annular flange 3 and having an opening 6 communicating therewith.

A rotary table 7 is provided with a central bore in which any suitable or desirable form of bushings may be mounted either to provide a straight rotary machine or a rotary machine of the make-and-break type as desired. The table 7 is formed with a downwardly extending flange 8 and a second downwardly extending flange 9 spaced from the flange 8. Formed integral with the flange 9 of the table 7, or formed as a ring shrunk onto the flange 9 is a bevel gear ring 10 through which the rotary table 7 is adapted to be driven.

Secured to the lower end of the inner flange 8 is a ring 11 secured in position by screw-threading the same upon the lower end of the flange 8, as indicated at 12. The extreme lower end of the flange 8 is castellated to enable the ring 11 to be keyed in adjusted position by inserting a headed key pin 13 through a suitable opening through the downwardly projecting boss 14. The head of the key pin 13 fits within one of the notches of the castellated portion of the flange 8. To retain the key pin 13 in locking position, a cotter key 15 is inserted through the small hole at the outer end of the pin 13.

The rotary table 7 is rotatably mounted upon the flanged bearing supporting ring 4 of the base 1 by means of suitable bearings 16 and 17; bearing 16 being the main supporting bearing when the thrust is directed downward and bearing 17 is a hold down bearing to support the load when the thrust is directed upwardly.

To seal the space between the flange 9 of the rotary table and the annular flange 3 a circular flange 18 is preferably cast integral with the table 7 and is provided with a circular groove 19 while the extreme upper end of the annular flange 3 is machined as at 20 to project into the groove 19.

As previously stated, the open ended gear housing 5 is formed integral with the base 1 and is positioned adjacent the annular flange 3 and there is provided an opening 6 communicating between the gear housing 5 and the annular flange 3.

Suitably mounted within the opening 6 is a suitable bearing 21 and rotatably mounted within the bearing 21 is a pinion shaft 22. An end plate 23 is secured by means of cap screws 24, or other suitable securing means, to close the open end of the gear housing 5, and is provided with two openings 25 and 26. The opening 25 is in line with opening 6 and is provided with a suitable bearing 27 for rotatably supporting the outer end of the pinion shaft 22. The thrust of pinion shaft 22 is in one direction transferred to the end plate 23 by means of a thrust nut 28 adjustably screwed upon the threaded extended portion 29 of the pinion shaft 22 and bears against the outer bearing surface of the bearing retaining plate 30 which in turn is secured to the end plate 23 by means of cap screws 31, or equivalent means. The bearing retaining plate is provided with an annular flange extending into the opening 25 to contact one side of the bearing 27. To lock the thrust nut 28 to the threaded portion 29 of the shaft 22 the outer face is provided with a plurality of rectangular recesses 32; a locking plate 33 is secured to the extended portion 29 by means of screws 33a.

Keyed to one end of the pinion shaft 22 is the bevel pinion 34 in driving engagement with the bevel ring gear 10, and also keyed to the pinion shaft 22 are driven gears 35 and 36. The hub portions of the gears 35 and 36 are extended longitudinally and are in contacting engagement while the gear portions are spaced apart.

Secured to or formed integral with the extended hub of the driven gear 36 are a plurality of locking lugs 37. The bevel pinion 34 and the gears 35 and 36 are not only keyed to the shaft 22, but are also a press fit thereon so as to be securely fastened thereto. The thrust of the shaft in the other direction is transmitted to the inner race of the bearing 21, thence through the hubs of the gears 35 and 36 and thence to the inner race of the bearing 27 through the bearing to the outer race, and thence to the annular flange of the bearing retaining plate 30 and finally through the end plate 23 to the gear housing 5.

Mounted within the gear housing 5 is a jack shaft 37a rotatably mounted at its inner end upon a suitable bearing 38 which is supported within a machined bore 39 of the housing 5. The opening 26 of the end plate 23 is in line with the bore 39 and supports a second jack shaft bearing 40. The jack shaft 37a extends beyond the housing 5 a suitable distance to receive the usual driving sprocket.

A bearing cover plate 41 is provided to retain the bearing 40 in operative position as well as to close the opening 26 and to form with the shaft 37a a seal to prevent the loss of lubricant contained within the housing 5 and to prevent the intrusion of deleterious matter into the bearing 40 and the housing 5. Suitable cap screws 42 or equivalent means secure the plate 41 to the end plate 23.

Slidably mounted upon the jack shaft 37a is a large driving gear 43 having an extended hub portion 44 upon which is secured a second, but smaller driving gear 45. To enable the shaft 37a to drive the large driving gear 43, the shaft may be splined or provided with a key 46 extending substantially the full length of the shaft between the bearings 38 and 40, while the hub 44 of the gear 43 is provided with a suitable key-way. By referring to Figure 1, it will be seen that when the sliding gears 43 and 45 are in the position illustrated, the smaller gear 45 is in operative engagement with the large driven gear 35, resulting in the slow speed operation of the table. Should the sliding gears 43 and 45 be slid to adjacent the bearing 40, then the large driving gear 43 will operatively engage the driven gear 36, resulting in the high speed operation of the table. Thus, the driving power for rotating the table 7 is received by a sprocket keyed to the extended portion of the jack shaft 37a, transmitted through the jack shaft to the gears 43 and 45 by means of the key 46, then through either gear 43 or 45 to either of the selected gears 35 and 36 to the pinion shaft 22 by means of the key 26a, then from the shaft 22 to the bevel pinion by means of the key 34a to the ring gear 10 which is secured to the depending flange 9 of the table 7, and thus the table is rotated at high or low speed, depending upon which set of gears are in operative relation.

The means for shifting the sliding gears is preferably of the following construction: The gear housing 5 is provided with an opening 47 adjacent the sliding gears 43 and 45 which is closed by a shifter plate 48 secured to the housing by suitable cap screws 49. The shifter plate 48 is provided with a bearing boss 50 through which the shifter operating shaft 51 is rotatably mounted. An operating lever 54 is fixed on the inner end of the shaft 51 by a key 52 and a shoulder formed by the shaft head 53. Pivotally supported at the lower end of the operating lever 54 is a shifter shoe 55 which slidably engages both faces of the gear 43. Secured to the outer end of the shaft 51 by means of key 56 and cotter pin 57 is hand lever 58.

To yieldably lock the shifter mechanism in either high or low speed or in neutral position, the hand lever is provided with an opening in which is operatively mounted a pointed plunger 59 arranged to engage any one of the three depressions 60 suitably positioned in the shifter plate 48 and to yieldably hold the plunger 59 in the selected depression 60, a helical spring 61 is provided to act against a fixed collar on the plunger 59 and against the hand lever 58.

It will be noted that the driven gears 35 and 36 are spaced further apart than the width of the combined sliding gears 43 and 45 whereby when the sliding gears 43 and 45 are shifted to the central position the driving gears are out of operating engagement with the driven gears thus forming a neutral position.

Means are provided for locking the rotary table, which means may be any suitable or desirable construction and are herein illustrated as including a pair of locking pawls 70 and 71 secured to locking shafts 72 and 73 each separately journaled within a housing 74 formed integral with the housing 5. Secured to the extended portions of the shafts 72 and 73 respectively, are operating handles 75 and 76 having weights 77 and 78 at their ends so that when the shafts 72 and 73 are rotated beyond center in either direction, the locking pawls will be rotated to or from engaging position and held in such position by the force exerted by the weights. The locking pawls are positioned to engage the locking lugs 37 which may be formed upon the extended hub portion of the gear 36 or may be formed upon a separate ring keyed to the shaft 22. The locking pawl 70 when rotated by means of the handle 75, engages the locking lugs at a point above the horizontal center line of shaft 22 to lock the spur shaft 22 against counter-clockwise rotation but does not lock the shaft against clockwise rotation while the locking pawl 71 when rotated by means of the handle 76 engages the locking lugs at a point below the horizontal center line of the shaft 22 to lock the shaft against clockwise rotation but does not lock it against counter-clockwise rotation. By the arrangement of locking pawls just described the shaft 22 may be locked against rotation in either direction or may be locked against rotation in both directions by operating both pawls 70 and 71 into locking engagement.

This application is addressed to the invention as defined by the claims herein differing from the prior invention of David S. Faulkner, Allen E. Rice and Lewis E. Zerbe, as disclosed and claimed in the copending application, Serial No. 504,758 for Rotary machine, and it is not the intention of applicants herein to claim as their invention any matter common to this application and the copending application of Faulkner, et al., Serial No. 504,758.

Having fully described our invention, it is to be understood that we do not wish to be limited to the details herein set forth, but our invention is of the full scope of the appended claims.

We claim:

1. A locking means for a rotary table comprising the combination of, a locking wheel non-rotatably mounted upon the table drive spindle and having a plurality of locking lugs, an upper locking pawl journaled upon one side of the supporting base and having an operating handle for rotating said pawl into or out of locking engagement with the upper face of the locking wheel whereby the upper pawl locks the table against rotation in one direction but allows rotation in the other direction, a lower locking pawl directly beneath said upper pawl and journaled upon the same side of the supporting base, and having an operating handle for rotating the said pawl into or out of locking engagement with the lower face of the locking wheel, whereby the lower pawl locks the table against rotation in the other direction but allows rotation in one direction, whereby when both locking pawls are operated into engagement with the locking wheel the rotary table is locked against rotation in both directions.

2. A locking means for a rotary table comprising the combination of a locking wheel non-rotatably mounted upon the table driving spindle and having a plurality of locking lugs, an upper locking pawl journaled upon one side of the supporting base, and having an operating handle for rotating the said pawl into or out of locking engagement with the upper face of said locking wheel whereby the said pawl locks the table against rotation in one direction but allows rotation in the other direction, and having means for retaining the operating handle in either adjusted position, a lower locking pawl directly beneath said upper pawl and journaled upon the same side of the supporting base, and having an operating handle for rotating the said pawl into or out of locking engagement with the lower face of said locking wheel whereby the said pawl locks the table against rotation in the other direction but allows rotation in the one direction, and having means for retaining the operating handle in either adjusted position whereby when both locking pawls are operated into engagement with the locking wheel the rotary table is locked against rotation in both directions.

3. In a rotary machine, the combination of a base having an annulus substantially U-shaped in cross section, and a casing adjacent thereto and communicating therewith, a table rotatably mounted upon one portion of said annulus and forming a seal with another portion, and having a depending flange extending therein and a gear ring carried by said flange, a table driving mechanism journaled in said base casing and having a driving pinion positioned in said annulus and in operative relation with said gear ring, and having a plurality of selective speeds, and one shaft of said mechanism extended beyond said casing to receive a driven sprocket, and having means for selecting and retaining the selected table speed in adjusted position.

4. In a rotary machine, the combination of a base, having an annulus substantially U-shaped in cross section and a casing adjacent thereto and communicating therewith, a table rotatably mounted upon one portion of said annulus and forming a seal with the other portion thereof and having a depending flange extending therein and a gear ring carried thereby, a table driving mechanism journaled in said base casing and a driving pinion positioned in said annulus and in operative relation with said gear ring and suitably mounted upon one of said mechanism shafts which is journaled in and extends through said opening between said base annulus and casing and having a plurality of selective speeds and having the other shaft of said mechanism extending through and beyond said casing to receive a driven sprocket, and having means for selecting the desired speed and retaining said means in the adjusted position.

5. In a rotary machine, the combination of a base having an annulus substantially U-shaped in cross section and a casing adjacent thereto and communicating therewith, a table rotatably mounted upon one portion of said annulus and forming a seal with the other portion thereof and having a depending flange extending therein and a gear ring carried thereby, a table driving mechanism journaled in said base casing and a driving pinion positioned in said annulus and in operative relation with said gear ring and suitably mounted upon one of said mechanism shafts which is journaled in and extends through said opening between said base annulus and casing and having a plurality of selective speeds and having the other shaft of said mechanism extending through and beyond said casing to receive a driven sprocket, and having means for selecting the desired speed.

6. In a rotary machine, the combination of a base having an annulus substantially U-shaped in cross section and a casing adjacent thereto and communicating therewith, a table rotatably mounted upon one portion of said annulus and forming a seal with the other portion thereof and having a depending flange extending therein and a gear ring carried thereby, a table driving mechanism journaled in said base casing and a driving pinion positioned in said annulus and in operative relation with said gear ring and suitably mounted upon one of said mechanism shafts which is journaled in and extends through said opening between said base annulus and casing and having a plurality of selective speeds and having the other shaft of said mechanism extending through and beyond said casing to receive a driven sprocket, and having means for selecting the desired speed, and having two independent locking means associated with said driving mechanism, one to lock said mechanism against rotation in one direction and the other to lock the mechanism against rotation in the other direction, said locking means being enclosed within the casing enclosing the driving mechanism and being operable from the exterior of said casing through the means extending through said casing.

7. In a rotary machine, the combination of a base having an annulus substantially U-shaped in cross section and a casing adjacent thereto and communicating therewith, a table rotatably mounted upon one portion of said annulus and forming a seal with the other portion thereof and having a depending flange extending therein and a gear ring carried thereby, a table driving mechanism journaled in said casing and having a driving pinion positioned in said annulus and in operative relation with said gear ring and suitably mounted upon one of said mechanism shafts which is journaled in and extends through said opening between said base annulus and casing and an adjustable thrust bearing for said shaft whereby said driving pinion may be adjusted to said ring gear and having a plurality of selected speeds and having the other shaft of said mechanism extending through and beyond said casing to receive a driven sprocket, and having means for selecting the desired speed and retaining said means in the adjusted position.

8. In a rotary machine, the combination of a base having a vertically extending opening therein, and having an outwardly extending pinion shaft supporting portion, a rotary table rotatably supported by the base in said opening, a pinion shaft housing supported by the pinion shaft supporting portion of the base, a pinion shaft rotatably supported within the housing, drive means carried by the shaft and adapted to drive the rotary table, a lock ring non-rotatably mounted on the shaft within the housing, two locking pawl shafts journaled within the housing at one side of the housing, a locking pawl mounted within the housing on each locking pawl shaft, one of said locking pawls adapted to engage the lock ring to hold the pinion shaft from rotation in one direction, and the other of said locking pawls being adapted to engage said lock ring to hold the pinion shaft from rotation in the other direction, and means extending through the housing for operating said lock pawls into and out of engagement with said lock ring from the exterior of said housing.

9. In a rotary machine, the combination of a base having a vertically extending opening therein and an outwardly extending pinion shaft supporting portion, a rotary table rotatably supported by the base in the opening, a pinion shaft housing supported by the pinion shaft supporting portion, a pinion shaft rotatably supported within said housing, drive means carried by the shaft and adated to drive the rotary table, locking means non-rotatably mounted on the shaft within the housing, a pair of lock pawl shafts mounted within the housing on one side of the pinion shaft, a locking pawl mounted on each of said shafts, counterweight means for retaining the pawls in either the engaged or disengaged position, one of said locking pawls adapted to engage the lock ring to hold the pinion shaft from rotation in one direction, and the other of said locking pawls being adapted to engage said lock ring to hold the pinion shaft from rotation in the other direction, and means extending through the housing for operating said lock pawls into and out of engagement with said lock ring from the exterior of said housing.

10. In a rotary machine, the combination of a base having a vertically extending opening therein and having an outwardly extending pinion shaft supporting portion, a rotary table rotatably supported by the base in said opening, a pinion shaft housing supported by the pinion shaft supporting portion of the base, a pinion shaft rotatably supported within the housing, drive means carried by the shaft and adapted to drive the rotary table, locking means non-rotatably mounted on the shaft within the housing, a pair of locking pawl shafts mounted within the housing on one side of the pinion shaft, said locking pawl shafts extending through the housing, a locking pawl mounted on each shaft in position to engage the lock means, one of said locking pawls being adapted to engage the lock means to hold the pinion shaft from rotation in one direction, and the other of said locking pawls being adapted to engage said lock ring to hold the pinion shaft from rotation in the other direction, and operating levers secured to the locking pawl shafts exteriorly of the housing for operating said lock pawls into and out of engagement with the lock means.

11. In a rotary machine, the combination of a base having an upwardly projecting annular flange, a rotary table, bearing means provided on said annular flange to rotatably support said table, said table being provided with a downwardly depending annular flange surrounding the bearing means, a bevel gear ring having gear teeth carried by said annular flange, said gear teeth being formed on the upper face of said gear ring, and in a plane below the plane of the table bearing means and a driving pinion positioned above and in operative relation with said gear ring.

12. In a rotary machine, the combination of a base having an upwardly projecting annular flange, a rotary table, bearing means provided on said annular flange to rotatably support said table, said table being provided with a downwardly depending annular flange surrounding the bearing means, a bevel gear ring having gear teeth carried by said annular flange, said gear teeth being formed on the upper face of said gear ring and having its pitch cone vertex in the horizontal plane of said table bearing means, and a driving pinion positioned above and in operative relation with said gear ring.

13. In an enclosed rotary machine, the combination of a base having an annulus substantially U-shaped in cross section, a rotary table, bearing means mounted upon one portion of said annulus to rotatably support said table, the table forming a seal with the other portion of said annulus, the table being provided with a downwardly depending annular flange surrounding the bearing means, a bevel gear ring having gear teeth carried by said annular flange, said gear teeth being formed on the upper face of said gear ring and below the plane of the table bearing means, and a driving pinion positioned above and in operative relation with said gear ring, said pinion being mounted on a shaft journaled in said rotary machine.

14. In an enclosed rotary machine, the combination of a base having an annulus substantially U-shaped in cross section, a rotary table having an inverted annulus substantially U-shaped in cross section straddling the inner portion of the base annulus, a bevel gear ring having gear teeth carried by the outer portion of the table inverted annulus at its lower end, said gear teeth being formed on the upper face of said gear ring, up-and-down thrust bearing means mounted upon the inner portion of said base annulus for rotatably supporting the table with relation to the base, said bearing means being located in the annular space formed within the inverted annulus of the rotary table, an adjustable ring mounted on the table to engage the lower portion of the up-and-down thrust bearing means, and means to drive said rotary table bevel gear.

15. In a rotary machine, the combination of a base, a table rotatably mounted thereon and having a gear ring, a table driving mechanism supported by the base including a pinion shaft and a drive shaft, the said shafts being journaled on the base in parallel relation, a table driving pinion positioned on the pinion shaft in operative relation with the gear ring, a driven member secured on the drive shaft, a plurality of change speed drive connections between the drive and pinion shafts, said drive connections being positioned in a space defined by parallel planes passed transversely of the shafts through the pinion and the driven member.

16. In a rotary machine, the combination of a base, a rotary table supported by the base and including a gear ring, the base having a vertically extending annular rim with means cooperating with the table to form a complete enclosure around the table and gear ring, a transmission casing supported on said base adjacent to the rim, and in communication with the table enclosure, a pinion shaft journaled within the casing, a driving pinion mounted on the shaft in operative relation with the gear ring, a drive shaft journaled within the casing and extending beyond the casing to receive a driven member, and a plurality of selective speed drive connections between the drive and pinion shafts, and means for selecting the desired speed connection.

17. In a rotary machine, the combination of a base, a rotary table supported by the base and including a gear ring, the base having a vertically extending annular rim with means cooperating with the table to form a complete enclosure around the table and gear ring, a transmission casing supported on said base adjacent to the rim, and in communication with the table enclosure, a pinion shaft journaled within the casing, a driving pinion mounted on the shaft in operative relation with the gear ring, a drive shaft journaled within the casing and extending beyond the casing to receive a driven member, a plurality of selective speed drive connections between the drive and pinion shafts, means for selecting the desired speed connection, and the plurality of selective speed drive connections between the pinion and drive shafts being positioned in the space defined between parallel vertical planes passed transversely of the shafts through the pinion and the driven member.

JOHN SHELBY MORGAN, Jr.
ALLEN ERWIN RICE.